(12) United States Patent
Asashiba et al.

(10) Patent No.: US 8,130,782 B2
(45) Date of Patent: *Mar. 6, 2012

(54) CONTROL SYSTEM USING A MINI SLOT SIGNAL IN A PASSIVE OPTICAL NETWORK

(75) Inventors: Yoshihiro Asashiba, Tokyo (JP); Toshikazu Yoshida, Tokyo (JP); Hiroaki Mukai, Tokyo (JP); Seiji Kozaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 540 days.

This patent is subject to a terminal disclaimer.

(21) Appl. No.: 11/932,803

(22) Filed: Oct. 31, 2007

(65) Prior Publication Data

US 2008/0069139 A1 Mar. 20, 2008

Related U.S. Application Data

(62) Division of application No. 10/147,885, filed on May 20, 2002, now Pat. No. 7,443,874.

(30) Foreign Application Priority Data

May 21, 2001 (JP) ................................ 2001-151302

(51) Int. Cl.
*H04B 7/212* (2006.01)
*H04J 3/16* (2006.01)
*H04J 3/22* (2006.01)
*H04J 14/08* (2006.01)

(52) U.S. Cl. ........................... 370/442; 370/468; 398/98

(58) Field of Classification Search ........................ None
See application file for complete search history.

(56) References Cited

U.S. PATENT DOCUMENTS

| 5,299,044 | A |   | 3/1994 | Mosch et al. |
| 5,303,234 | A |   | 4/1994 | Kou |
| 5,359,593 | A |   | 10/1994 | Derby et al. |
| 5,917,813 | A |   | 6/1999 | Van Driel et al. |
| 5,926,476 | A | * | 7/1999 | Ghaibeh .................. 370/395.65 |
| 5,930,018 | A |   | 7/1999 | Effenberger |
| 5,953,344 | A |   | 9/1999 | Dail et al. |
| 5,963,557 | A |   | 10/1999 | Eng |
| 6,023,467 | A |   | 2/2000 | Abdelhamid et al. |

(Continued)

FOREIGN PATENT DOCUMENTS

JP 11-146000 5/1999

(Continued)

OTHER PUBLICATIONS

U.S. Appl. No. 10/147,885 final action dated 18th Jan. 2008.*

*Primary Examiner* — Xavier Szewai Wong
(74) *Attorney, Agent, or Firm* — Oblon, Spivak, McClelland, Maier & Neustadt, L.L.P.

(57) ABSTRACT

A passive optical network including: a parent station OLT (optical line terminal); and a plurality of child stations ONU (optical network terminating unit), wherein the parent station and the plurality of child stations transmit an upstream frame and a downstream frame to each other, and the parent station includes means for generating a maintenance signal indicating failure at a mini slot, corresponding to each of the plurality of child stations, on a basis of a receiving state of a signal at the mini slot sent from each of the plurality of child stations.

15 Claims, 9 Drawing Sheets

U.S. PATENT DOCUMENTS

| | | | |
|---|---|---|---|
| 6,134,692 A * | 10/2000 | Sekiya et al. | 714/749 |
| 6,574,668 B1 | 6/2003 | Gubbi et al. | |
| 6,636,527 B1 | 10/2003 | Lee et al. | |
| 6,657,983 B1 * | 12/2003 | Surazski et al. | 370/337 |
| 6,721,504 B2 | 4/2004 | Kim et al. | |
| 6,801,547 B1 | 10/2004 | Boyd et al. | |
| 7,443,874 B2 * | 10/2008 | Asashiba et al. | 370/442 |
| 2002/0030875 A1 * | 3/2002 | Kim et al. | 359/168 |
| 2002/0172216 A1 * | 11/2002 | Asashiba et al. | 370/442 |

FOREIGN PATENT DOCUMENTS

| | | |
|---|---|---|
| JP | 2000-216803 | 8/2000 |
| WO | WO 99/09690 | 2/1999 |
| WO | WO99/38292 | 7/1999 |

* cited by examiner

Fig. 1

| TYPE | TRIGGER OF GENERATION | TRIGGER OF RESET |
|---|---|---|
| LOS-Di | WHEN AN O/E RECEIVER FOR DEALING ONUi IN OLT DOES NOT RECEIVE A MINI SLOT SIGNAL n TIMES CONSECUTIVELY IN AN EXPECTED PERIOD. | IN DBA OPERATION STATE, OLT RECEIVES AN OPTICAL SIGNAL MATCHED WITH ITS SLOT GRANT. |
| LCD-Di | WHEN A RECEIVER FOR DEALING ONUi IN OLT RECEIVES AN INEFFECTIVE DELIMITER n TIMES CONSECUTIVELY. | IN DBA OPERATION STATE, AN EFFECTIVE MINI SLOT SIGNAL IS RECEIVED. |
| CPE-Di | WHEN OLT CAN RECEIVE A CORRECT DELIMITER, A PHASE OF A RECEIVED MINI SLOT SIGNAL EXCEEDS A LIMIT CAUSING THE OLT UNCONTROLLABLE. | IN DBA OPERATION STATE, A MINI SLOT SIGNAL IN A CORRECT PHASE IS RECEIVED. |
| ERR-Di | A RESULT OF CRC ATTACHED TO A MINI SLOT SIGNAL AND A RESULT OF CRC BY OLT DO NOT MATCH. | A NEXT MINI SLOT SIGNAL IS RECEIVED. |

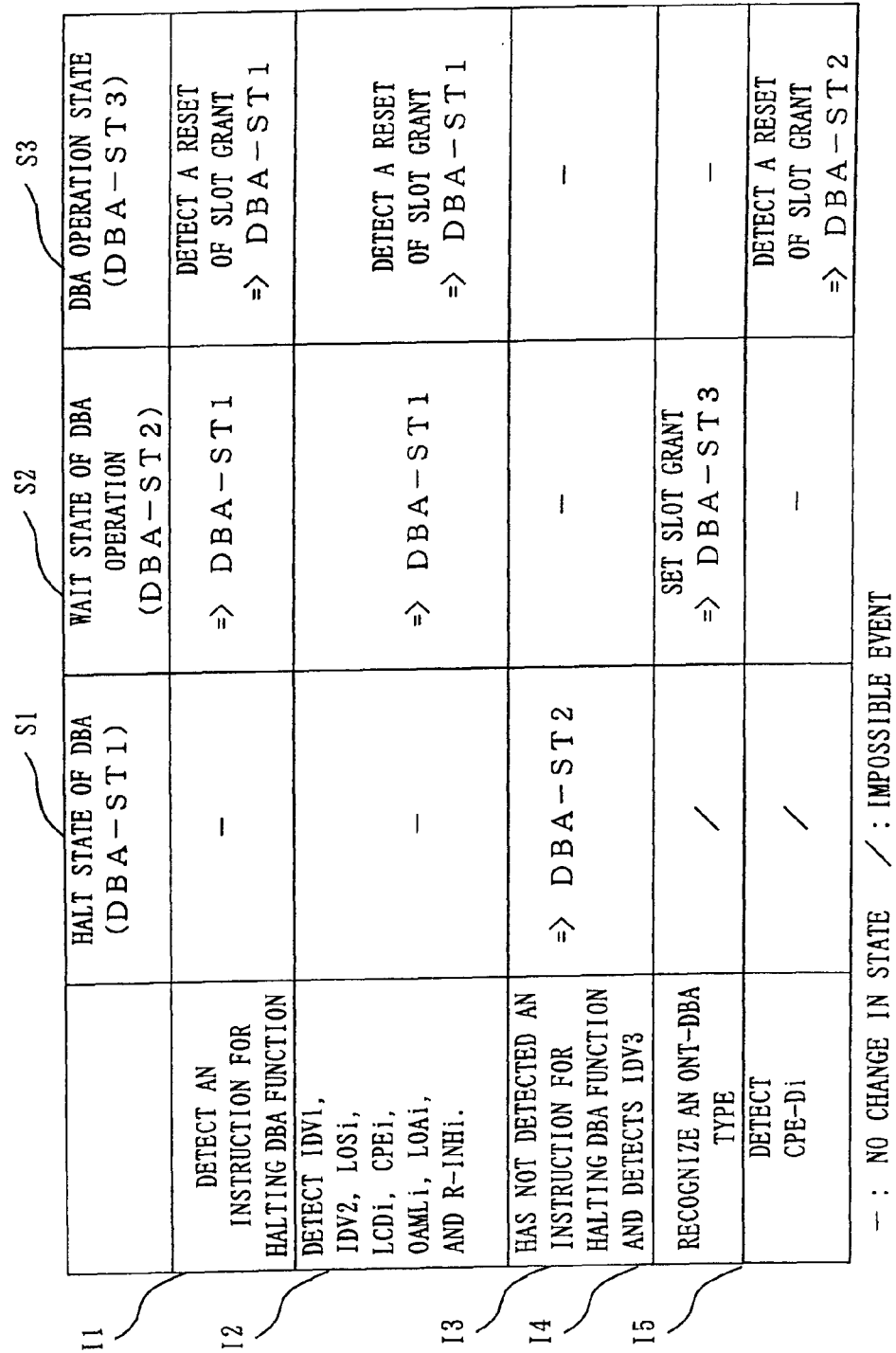

Fig. 5 RELATED ART

| | INITIAL STATE (OLT-IDV1) | STATE OF MEASURING DELAY (OLT-IDV2) | OPERATION STATE (OLT-IDV3) |
|---|---|---|---|
| INSTRUCT TO START MEASURING DELAY (n) | => OLT-IDV2 | — | — |
| COMPLETE MEASURING DELAY (n) | — | SEND RANGING TIME MESSAGE 3 TIMES NOTIFY THAT MEASURING DELAY IS COMPLETED (n) => OLT-IDV3 | — |
| DETECT ABNORMALITY OF MEASURING DELAY (n) | — | SEND RANGING TIME MESSAGE 3 TIMES NOTIFY THAT MEASURING DELAY IS COMPLETED (n) => OLT-IDV1 | — |
| DETECT LOSi, LCDi, CPEi, OAMLi, LOAi AND R-INHi | — | — | => OLT-IDV1 |
| NOTE-NOTICE OF COMPLETING MEASURING DELAY IS DESCRIBED PROPERLY, HOWEVER THIS EVENT IS DESCRIBED FOR CONVENIENCE. THEREFORE, THIS EVENT SHOULD BE HANDLED AS REFERENCE INFORMATION. | | | |

— : NO CHANGE IN STATE

Fig. 6
RELATED ART

| TYPE | TRIGGER OF GENERATION | TRIGGER OF RESET |
|---|---|---|
| LOSi | WHEN AN O/E RECEIVER FOR DEALING ONUi IN OLT DOES NOT RECEIVE AN EFFECTIVE UPSTREAM CELL 8 TIMES CONSECUTIVELY IN AN EXPECTED PERIOD. | IN OPERATION STATE, OLT RECEIVES AN OPTICAL SIGNAL MATCHED WITH GRANT. |
| LCDi | WHEN A RECEIVER FOR DEALING ONUi IN OLT RECEIVES AN INEFFECTIVE DELIMITER OR INEFFECTIVE HEC 8 TIMES CONSECUTIVELY. | IN A RECEIVER FOR DEALING ONUi IN OLT, CELL SYNCHRONIZATION IS ESTABLISHED IN OPERATION STATE. |
| CPEi | WHEN OLT CAN RECEIVE A CORRECT DELIMITER, A PHASE OF A RECEIVED CELL EXCEEDS A LIMIT CAUSING THE OLT UNCONTROLLABLE. | IN OPERATION STATE, A CELL IN A CORRECT PHASE IS RECEIVED. |
| OAMLi | A PLOAM CELL OF ONUi IS FAILED TO RECEIVE 3 TIMES CONSECUTIVELY. | IN OPERATION STATE, OLT RECEIVES A PLOAM CELL MATCHED WITH THE PLOAM GRANT. |
| LOAi | AFTER SENDING A PLURALITY OF UPSTREAM MESSAGES INDICATING THAT THERE IS ACK, OLT DOES NOT RECEIVE ACK. | OLT RECEIVES ACK. |
| R-INHi | OLT RECEIVES R-INH (RECEIVING ALARM SUPPRESSING MESSAGE) FROM ONUi. | OLT RECEIVES PLOAM CELL WHILE ONUi IS IN A RANGING PROCESS. |
| ERRi | DETECT UNMATCH BETWEEN BIP8 IN UPSTREAM AND THE RESULT OF BIP8 OF RECEIVED SIGNAL | RECEIVE A NEXT PLOAM CELL OF UPSTREAM |

Fig. 8
RELATED ART
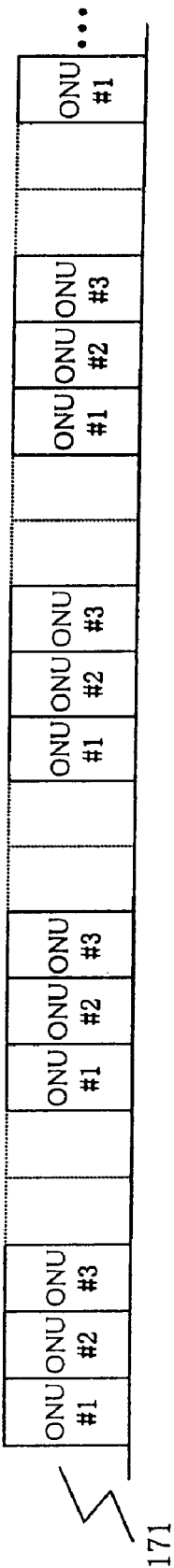
ARRANGEMENT OF UPSTREAM CELL
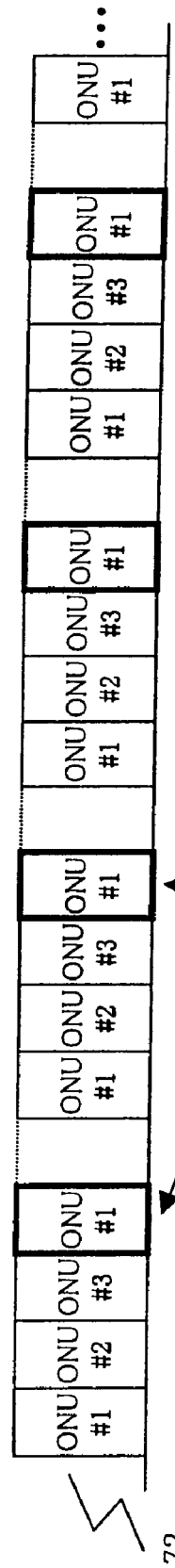
ARRANGEMENT OF DOWNSTREAM CELL
UPSTREAM BAND FOR ONU#1 INCREASED BY DBA

CONTROL SYSTEM USING A MINI SLOT SIGNAL IN A PASSIVE OPTICAL NETWORK

CROSS-REFERENCE TO RELATED APPLICATIONS

The present divisional application claims the benefit of priority under 35 U.S.C. §120 to application Ser. No. 10/147,885, filed on May 20, 2002, and under 35 U.S.C. §119 from Japanese Application No. 2001-151302, filed on May 21, 2001, the entire contents of both are hereby incorporated herein by reference.

BACKGROUND OF THE INVENTION

1. Field of the Invention

This invention relates to a maintenance signal corresponding to a mini slot signal in a slot according to international standard ITU-T G.983.1 regulating a physical interface in a PON (Passive Optical Network) and a method for controlling a state in dynamic bandwidth assignment (DBA) for upstream by using the mini slot signal.

2. Description of the Related Art

FIG. 3 illustrates an example of a configuration of a system in the PON including a DBA function, in which an OLT (optical line terminator—parent station) 101 and a plurality of ONU's (optical network terminating units—child stations) 102-104 are coupled to by a star coupler 105. FIG. 4 illustrates a downstream frame format 151 and an upstream frame format 152 in the PON according to international standard ITU-T G.983.1 regulating a physical interface in the PON according to the related art. FIG. 5 shows a state transition table for managing a state of an individual ONU dealing unit in the OLT according to international standard ITU-T G.983.1 regulating an operation by the OLT for controlling starting and halting of an individual ONU. FIG. 6 illustrates an example of a condition of detecting and resetting according to international standard ITU-T G.983.1 related to a maintenance signal provided for each of the ONU's indicating a state of receiving an ATM (asynchronous transfer mode) cell and PLOAM (Physical Layer Operation Administration and Maintenance) cell in an upstream frame in the OLT. Further, FIG. 7 illustrates a format of a mini slot in a slot according to international standard ITU-T G.983.1 related to the upstream frame.

In FIG. 3, the OLT 101 includes an individual ONU dealing unit 106B, a generator 107 for downstream frame, a controller 108 for upstream band, a DBA controller 109B, a terminator 110 of upstream frame, and a terminator 111 of mini slot. The ONU 103 includes a terminator 112 of downstream frame, a detector 113 for upstream band, a cell buffer 114 for upstream, a monitor 115 for buffer state, and a cell generator 116 for upstream.

With reference to FIG. 3, an operation in the PON is explained.

The OLT 101 receives a main signal 122 of downstream including an ATM cell, and generates a frame signal 124 of downstream by the generator 107 for downstream frame. Particularly, the generator 107 for downstream frame receives control information 126 on the ONU from the individual ONU dealing unit 106B and information 125 on an upstream band from the controller 108 for upstream band, generates a PLOAM cell of downstream, and inserts the generated PLOAM cell into the frame signal 124 of downstream. The individual ONU dealing unit 106B exchanges information on each of the ONU's as a control signal 121 with an external operation system.

A frame signal 129 of upstream sent from each of the ONU's is terminated. A regular cell is terminated by the terminator 110 of upstream frame, and a mini slot is terminated by the terminator 111 of mini slot. The terminator 110 of upstream frame detects a PLOAM cell of upstream when the regular cell is terminated, and notifies the individual ONU dealing unit 106B of control information 130 on the ONU corresponding to the PLOAM cell. At the same time, the terminator 110 of upstream frame outputs a main signal 123 of upstream when the ATM cell besides the PLOAM cell is detected. State information 131 on a cell buffer for upstream of an ONU corresponding to the mini slot terminated by the terminator 111 of mini slot is sent to the DBA (Dynamic Bandwidth Assignment) controller 109B. Further, state information 127 corresponding to the individual ONU and information 132 on the upstream band is sent to the DBA controller 109B and the controller 108 for upstream band, and an operation of dynamic bandwidth assignment (DBA) for upstream is performed.

The ONU 103 extracts a main signal 141 of downstream including an ATM cell directed to the ONU 103 as the terminator 112 of downstream frame terminates a downstream frame signal 143. Particularly, a PLOAM cell 144 of downstream is extracted, and control information 145 on outputting the upstream cell is output to the cell generator 116 for upstream by the detector 113 for upstream band.

Further, a main signal 142 of upstream including the ATM cell is maintained in the cell buffer 114 for upstream once, and read out as information 146 on the cell based on an instruction from the cell generator 116 for upstream. A header is attached to the information 146 on the cell by the cell generator 116 for upstream, and the information 146 on the cell is output as a frame signal 149 of upstream. Information 147 on the cell buffer 114 for upstream is always monitored by the monitor 115 for buffer state, and output to the cell generator 116 for upstream as information 148 on a buffer state for mapping in the mini slot.

In the following, with reference to FIG. 4, a frame format of upstream and a downstream frame used in the PON system is explained.

In FIG. 4, the frame format 151 of downstream includes 56 ATM cells in a fixed length of 53 bytes located consecutively. Among the cells, the first cell and the 29th cell are PLOAM cells for monitoring and controlling between the OLT and the ONU.

The upstream frame format 152 includes 53 cells of 56 bytes. 56 bytes include 3 bytes of overhead and 53 bytes of ATM cells. It is also possible that the PLOAM cell is provided in an ATM cell at an arbitrary position. According to international standard ITU-T G.983.1, in a system configuration illustrated in FIG. 3, the OLT 101 manages a state of each of the ONU's 102-104 connected to the PON individually based on a state transition table of the individual ONU dealing unit in the OLT illustrated in FIG. 5.

In the following, a state transition operation of the individual ONU dealing unit in the OLT illustrated in FIG. 5 is explained.

In FIG. 5, columns arranged horizontally illustrate an initial state (OLT-IDV1), a state of measuring delay (OLT-IDV2), and an operation state (OLT-IDV3). The initial state (OLT-IDV1) illustrates a state of initializing a start operation temporally as a corresponding ONU is not started or there is a certain failure. The state of measuring delay (OLT-IDV2) illustrates a state of measuring a delay in transmission of a cell due to a transmission distance between the OLT and the ONU. The operation state (OLT-IDV3) illustrates a state of transmitting an upstream cell in timing in which the ONU compensated the delay in upstream by measuring the delay in the transmission of the cell due to the transmission distance and informing the ONU of information on the measured delay by the OLT.

Rows arranged from a top to a bottom regulate a horizontal direction, and illustrate four state transition events: instructing to start measuring delay (n), completing measuring delay (n), detecting abnormality of measuring delay (n), and detecting each of maintenance signals (LOSi, CPEi, LCDi, OAMLi, LOAi, R-INHi). In this description, n means the number of ONU. Instructing to start measuring delay (n) is an instruction issued in the initial state when the ONU is started. Completing measuring delay (n) is issued to the ONU which is measured the delay in the state of measuring delay when the delay is measured normally. Detecting abnormality of measuring delay (n) is issued to the ONU which is measured the delay in the state of measuring delay when the delay is not measured normally. Each of the maintenance signals is a signal detected and reset in the operation state in each of conditions illustrated in FIG. 6.

With reference to FIG. 5, an operation of a third ONU (n=3) is explained as an example. The third ONU which is in the initial state (OLT-IDV1) receives a state transition event of instructing to start measuring delay (n), and a state transits to the state of measuring delay (OLT-IDV2). When measuring of the delay is completed, a state transition event of completing measuring delay (n) is received, and the state transits to the operation state (OLT-IDV3). However, when measuring of the delay is failed due to a certain reason, a state transition event of detecting abnormality of measuring delay (n) is received, and the state transits to the initial state (OLT-IDV1). The individual ONU dealing unit in the OLT corresponding to the third ONU which is in the operation state (OLT-IDV3) begins to monitor each of the maintenance signals (LOSi, CPEi, LCDi, OAMLi, LOAi, R-INHi) corresponding to the third ONU. When at least one of the maintenance signals is detected, the state transits to the initial state (OLT-IDV1). After then, the individual ONU dealing unit in the OLT corresponding to the third ONU which is not in the operation state is started to go back to the operation state by a state transition event of instructing to start measuring delay (n) which occurs regularly.

An operation of the mini slot signal illustrated in FIG. 7 is explained.

The ONU which is in the operation state communicates by using the downstream frame format 151 and the upstream frame format 152 as illustrated in FIG. 4. In a certain phase of a cell, there is a case in which a certain cell is used in a slot 162 of an upstream frame 161 illustrated in FIG. 7 and the ONU sends a mini slot signal 163. In this case, when the OLT sets a phase of an upstream cell in the slot 162, a plurality of ONU's send the mini slot signals 163 in the slot 162. In this case, the mini slot signals 163 sent from the plurality of ONU's are controlled by the OLT for preventing collision. For preventing the collision, the OLT sets a phase (offset) from a beginning of the slot 162 and information on length of the mini slot signal 163 corresponding to the ONU in the ONU's individually.

In the following, as an example of operating a system using the mini slot signal illustrated in FIG. 8, control in dynamic bandwidth assignment (DBA) for upstream is explained.

The dynamic bandwidth assignment (DBA) for upstream is performed by using a mini slot signal including a function equivalent to an individual communication channel besides a regular cell from the plurality of ONU's to the OLT. By using the mini slot signal, each of the ONU's informs the OLT of a buffer state of upstream in the ONU. Then, the OLT extracts a content of the mini slot signal, and detects a buffer state in each of ONU's. It is a control method for reallocating the upstream bandwidth dynamically to each of the ONU's based on the information in the mini slot signal. For applying this control method, it is necessary that the OLT detects if the ONU can deal with the mini slot signal before controlling the bandwidth by using the mini slot.

In FIG. 8, arrangement 171 of cells in the upstream frame when the OLT provides an arbitrary band of upstream for each of the ONU's is illustrated. In the arrangement 171 of cells for upstream, ONU#1 shows a cell sent from a first ONU in a band allocated for the first ONU. ONU#2 and ONU#3 also show cells. In this state, all of the ONU's informs the OLT of a cell buffer state for upstream by using the mini slot signal constantly. For example, when it is judged that the cell buffer state for upstream in the first ONU exceeds a threshold value of the buffer determined by the OLT, the OLT temporally allocates a bandwidth wider than a present bandwidth of the upstream band. Therefore, the arrangement 171 of the cells is changed to an arrangement 172 of the cells in the upstream frame. The arrangement 172 indicates that an utilized upstream band is allocated to the first ONU.

A control method using the mini slot signal in the slot according to international standard ITU-T G.983.1 regulating the physical interface in the PON according to the related art only describes a configuration of a format of the slot. There isn't any definition about maintenance signal by the mini slot. There isn't also any definition of using the mini slot for DBA request, and of controlling method for the mini slot. Therefore, it is impossible to monitor and control a receiving state of the regular cell and the mini slot signal individually. For example, when the maintenance signal of the regular cell illustrated in FIG. 6 is used for the mini slot signal, even if only the mini slot signal operates in failure, it is judged as a state transition of the regular cell of the ONU by the individual ONU dealing unit 106B in the OLT illustrated in FIG. 5, and whole communication is suspended.

Further, FIG. 9 illustrate a state of failure of the mini slot signal in the slot 181. As illustrated, when the ONU misjudges a phase of transmission of the mini slot signal, there is a possibility of the collision with another cell or mini slot signal sent from another ONU, located before and after the mini slot signal. In such a case, there is no method of individually controlling the mini slot signal in failure by misjudging the phase of transmission, a state of the collision is maintained, and transmission of the cell or mini slot from another ONU is prevented continuously. Particularly, when the assignment of the upstream band to the ONU is controlled dynamically by using the mini slot signal, communication by all of the other ONU's is prevented by the failure of the mini slot signal of one ONU as in this case.

SUMMARY OF THE INVENTION

A passive optical network including: a parent station OLT (optical line terminal); and a plurality of child stations ONU (optical network terminating unit), wherein the parent station and the plurality of child stations transmit an upstream frame and a downstream frame to each other, and the parent station includes means for generating a maintenance signal indicating failure at a mini slot, corresponding to each of the plurality of child stations, on a basis of a receiving state of a signal at the mini slot sent from each of the plurality of child stations.

BRIEF DESCRIPTION OF THE DRAWINGS

FIG. 1 illustrates an example of a maintenance signal for a mini slot signal provided in Embodiment 1 of this invention;

FIG. 2 shows a state transition table corresponding to the dynamic bandwidth assignment (DBA) for upstream by using the mini slot signal in Embodiment 1 of this invention;

FIG. 5 shows a state transition table of the individual ONU dealing unit (n) in the OLT according to international standard ITU-T G.983.1 regulating the physical interface in the PON;

FIG. 6 illustrates an example of the maintenance signal for monitoring each of the ONU's by the OLT according to international standard ITU-T G.983.1 regulating the physical interface in the PON;

FIG. 8 shows an explanatory chart of an operation of dynamic bandwidth assignment (DBA) for upstream by using the mini slot signal.

DETAILED DESCRIPTION OF THE PREFERRED EMBODIMENTS

Embodiment 1

Figure 3:
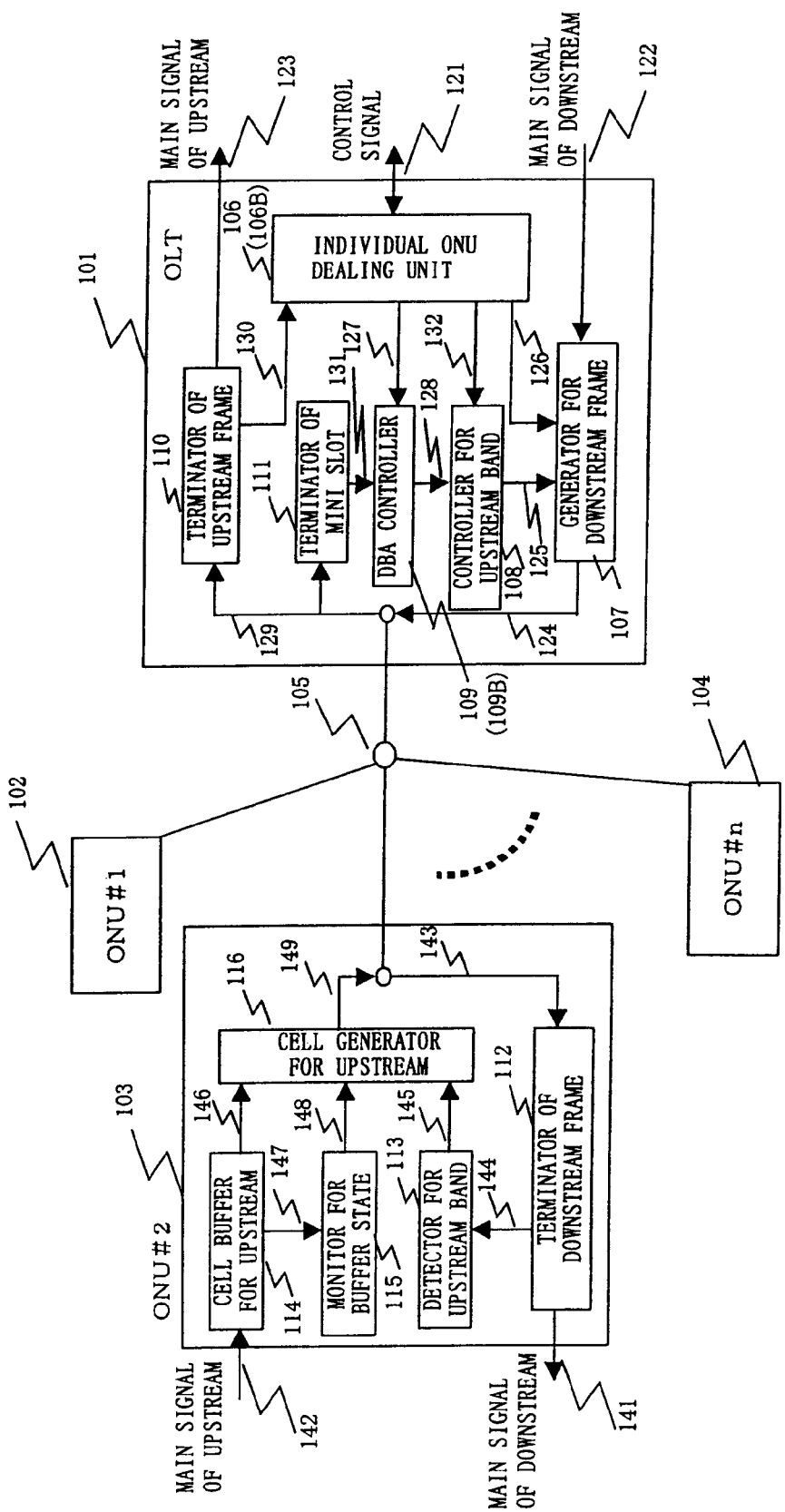
FIG. 3 shows a configuration chart for explaining the PON system and the function of the OLT and the ONU.
Figure 4:
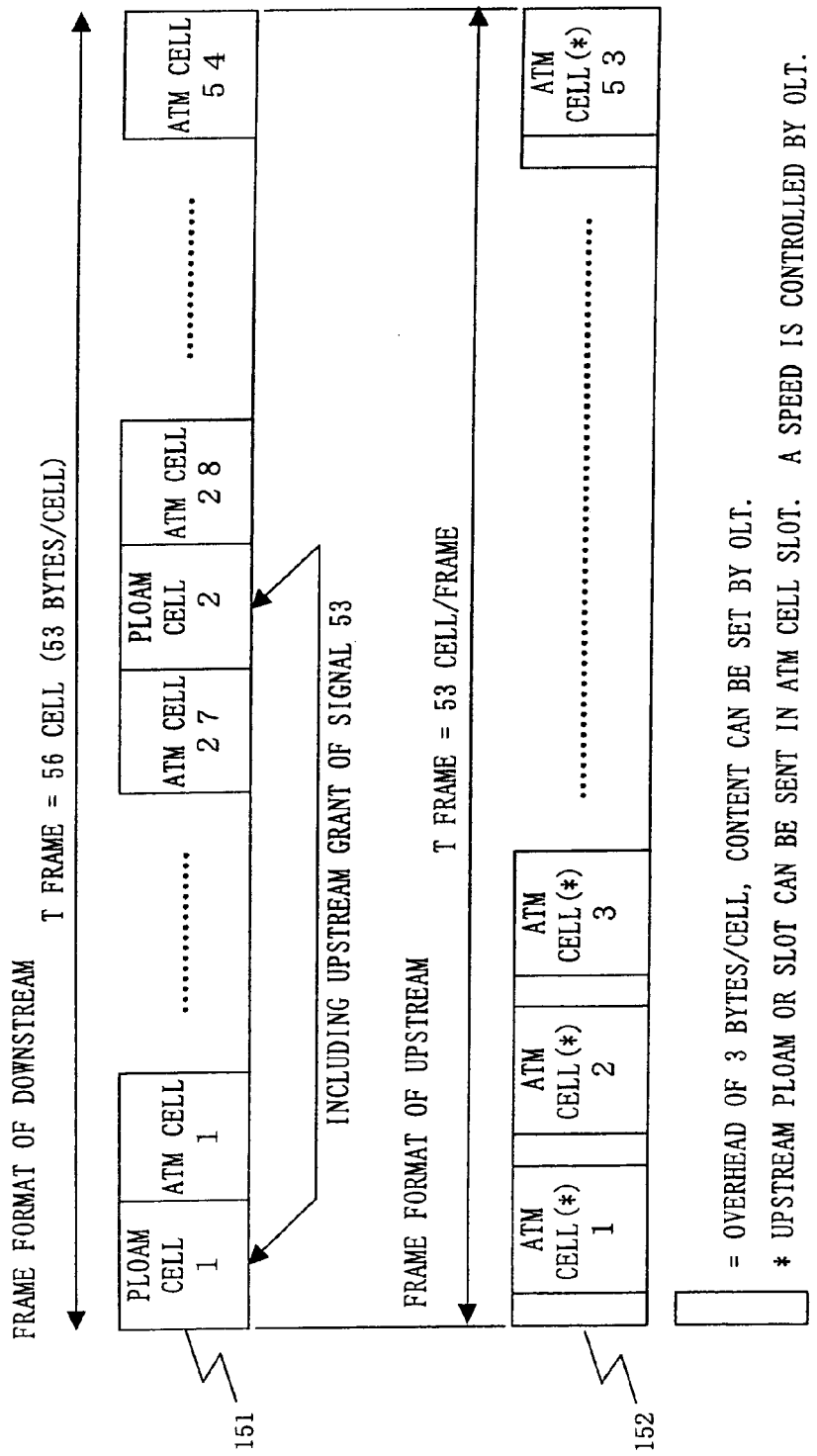
FIG. 4 illustrates a frame format of downstream and an upstream frame according to international standard ITU-T G.983.1 regulating the physical interface in the PON.
Figure 7:
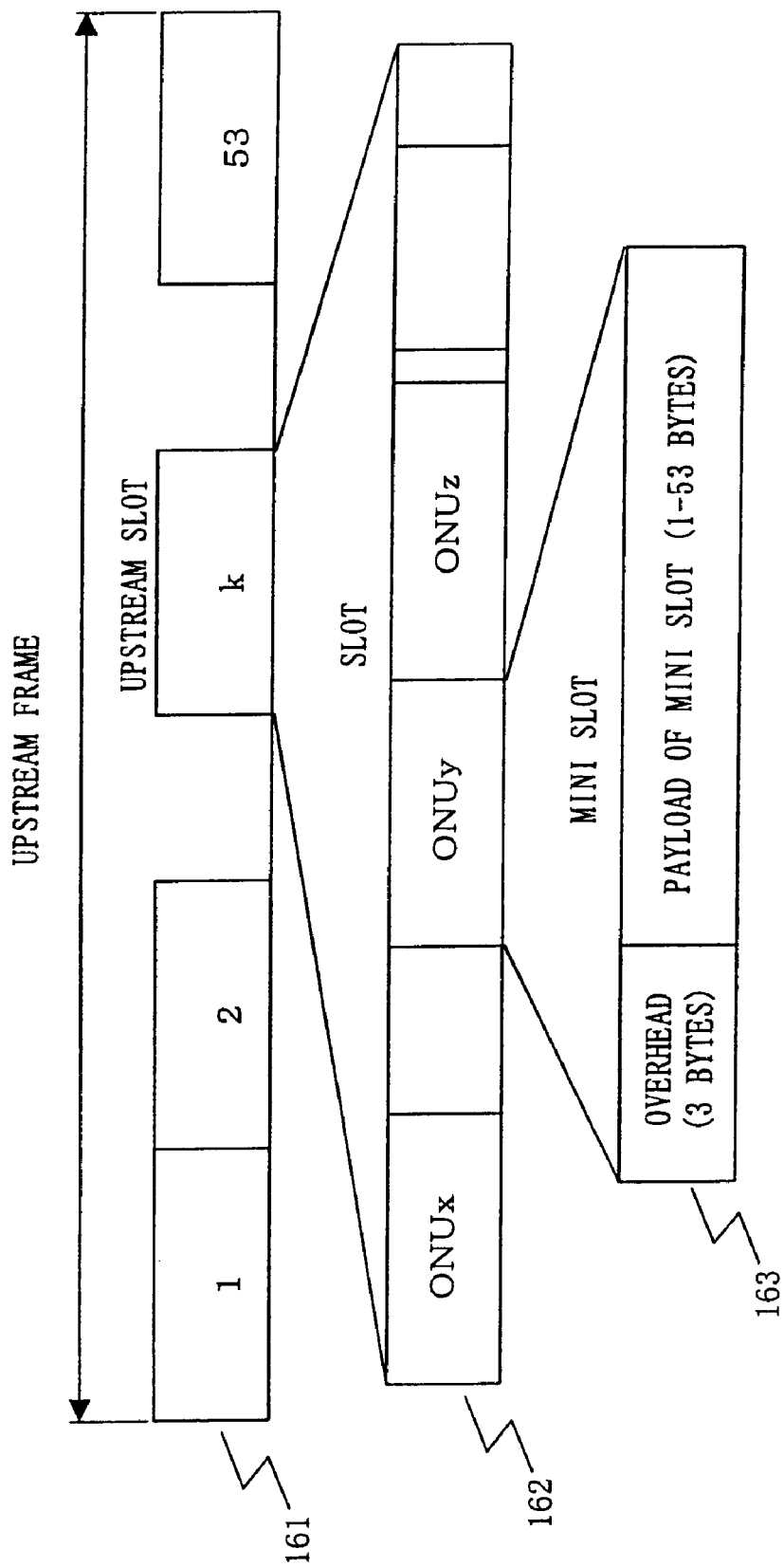
FIG. 7 shows a configuration chart of an upstream frame, a slot and a mini slot according to international standard ITU-T G.983.1 regulating the physical interface in the PON.

Embodiments of this invention are explained.

A maintenance signal for a mini slot signal and an operation of this invention are explained by FIG. 1 and FIG. 2.

In FIG. 1, as types of the maintenance signal, failure of receiving a mini slot signal (LOS-Di) I51, out-of-synchronization of the mini slot signal (LCD-Di) I52, error in a phase of receiving the mini slot signal (CPE-Di) I53, error in a block of the mini slot signal (ERR-Di) I54 are provided besides the maintenance signal of the regular cell.

FIG. 2 shows a state transition table for corresponding the maintenance signals for the mini slot signal described in FIG. 1 to a state of controlling the ONU individually by the OLT. An operation of this invention is explained by FIG. 1 and FIG. 2. As illustrated in FIG. 2, an individual ONU dealing unit 106 and a DBA controller 109, which are provided additionally, manage and control by performing the dynamic bandwidth assignment (DBA) for upstream corresponding to each of the ONU's individually. In this embodiment, the individual ONU dealing unit 106 and the DBA controller 109 provide three states, i.e., halt state of DBA (DBA-ST1) S1, wait state of DBA operation (DBA-ST2) S2 and DBA operation state (DBA-ST3) S3 arranged horizontally in FIG. 2 as states of controlling the DBA by using the mini slot signal. Further, as state transition events for changing the states, the state transition events are regulated sequentially from the top to the bottom in FIG. 2. Event I1 of detecting the instruction for halting the DBA function for instructing if a function of the DBA is operated, and event I2 of detecting a state in which the OLT controls the ONU individually and one of maintenance signals IDV1, IDV2, LOSi, LCDi, CPEi, OAMLi, LOAi, and R-INHi are provided. Further, event I3 of detecting IDV3 without detecting the instruction of halting the DBA function, and event I4 of recognizing an ONT-DBA type are provided. Finally, an event I5 of detecting CPE-Di which is a maintenance signal of the mini slot signal is provided. A number of a child station of 1-n is shown as i.

The maintenance signal for the mini slot signal described in FIG. 1 is explained.

When an O/E receiver for dealing ONUi in the OLT does not receive an effective optical signal in an expected period for receiving an upstream mini slot signal n times consecutively, it is judged that interruption of receiving a mini slot signal (LOS-Di) is detected. When the OLT receives an optical signal matched with its slot GRANT in the DBA operation state (DBA-ST3), it is judged that the interruption of receiving the mini slot signal (LOS-Di) is reset.

When the receiver for dealing ONUi in the OLT receives an ineffective delimiter n times consecutively, it is judged that out-of-synchronization of the mini slot signal (LCD-Di) is detected. When a mini slot signal in a correct phase is received in the DBA operation state (DBA-ST3), it is judged that the out-of-synchronization of the mini slot signal (LCD-Di) is reset.

When a phase of a received mini slot signal exceeds a limit causing the OLT uncontrollable in a period when the OLT can receive a correct delimiter, it is judged that error in a phase of receiving the mini slot signal (CPE-Di) is detected. When a mini slot signal in a correct phase is received, it is judged that the error in the phase of receiving the mini slot signal (CPE-Di) is reset.

When a result of CRC (cyclic redundancy check) attached to the mini slot signal and a result of CRC by the OLT are not matched, it is judged that error in a block of the mini slot signal (ERR-Di) is detected. When a next mini slot signal is received, it is judged that error in the block of the mini slot signal (ERR-Di) is reset.

In the PON system using the maintenance signal corresponding to the mini slot signal as explained with reference to FIG. 1, the individual ONU dealing unit 106 in the OLT relates a state of controlling the ONU individually with a maintenance signal for the mini slot signal. Further, the DBA controller 109 controls dynamic bandwidth assignment (DBA) for upstream corresponding to each of ONU's individually. The OLT performs the dynamic bandwidth assignment (DBA) for upstream based on the state transition table illustrated in FIG. 2.

With reference to FIG. 2, controlling state transition of the mini slot signal for performing the dynamic bandwidth assignment (DBA) for upstream is explained. How the individual ONU dealing unit 106 in the OLT relates a state of controlling the ONU individually with the maintenance signal for the mini slot signal is explained.

After the individual ONU dealing unit 106 in the halt state of DBA (DBA-ST1), i.e., a state before detecting an instruction of stopping DBA function, detects that a state of the individual ONU dealing unit (n) in the OLT is IDV3 (operation state), the individual ONU dealing unit 106 instructs the ONU to be in the state transits to the wait state of DBA operation (DBA-ST2). Then, when a certain maintenance signal (LOSi, LCDi, CPEi, OAMLi, LOAi, R-INHi) for the regular cell is detected or IDV1 (initial state) or IDV2 (state of measuring delay) is detected as a state of the individual ONU dealing unit in the OLT, it is judged that the concerning ONU is not in the operation state. Then, the slot GRANT is reset, and the state transits to the halt state of DBA (DBA-ST1) again.

Further, when the individual ONU dealing unit in the wait state of DBA operation (DBA-ST2) recognizes an ONT-DBA type by ITU-TG.983.2, the slot GRANT is set, and the state transits to the DBA operation state (DBA-ST3). When a certain maintenance signal (LOSi, LCDi, CPEi, OAMLi, LOAi, R-INHi) is detected, or the state of the individual ONU dealing unit (n) in the OLT is either IDV1 or IDV2, the individual ONU dealing unit (n) in the OLT which is the DBA operation state (DBA-ST3) judges that the concerning ONU is not in the operation state. Then, setting of the slot GRANT is reset, and the state transits to the halt state of DBA (DBA-ST1). Further, when error in the phase of receiving the mini slot signal (CPE-Di (n)) which is a maintenance signal concerning on the mini slot signal is detected, setting of the slot GRANT is reset, and the state transits to the wait state of DBA operation (DBA-ST2).

Further, when the DBA controller 109 which controls the dynamic bandwidth assignment (DBA) function individually detects the instruction of halting DBA function for a purpose of halting the dynamic bandwidth assignment (DBA) function, the state transits to the halt state of DBA (DBA-ST1).

In this embodiment, only the error in the phase of receiving the mini slot signal (CPE-Di) is set as an event. However, in addition to the error in the phase of receiving the mini slot signal (CPE-Di), it is possible to set events of out-of-synchronization of the mini slot signal (LCD-Di) and interruption of receiving the mini slot signal (LOS-Di) as OR condition.

Figure 9:
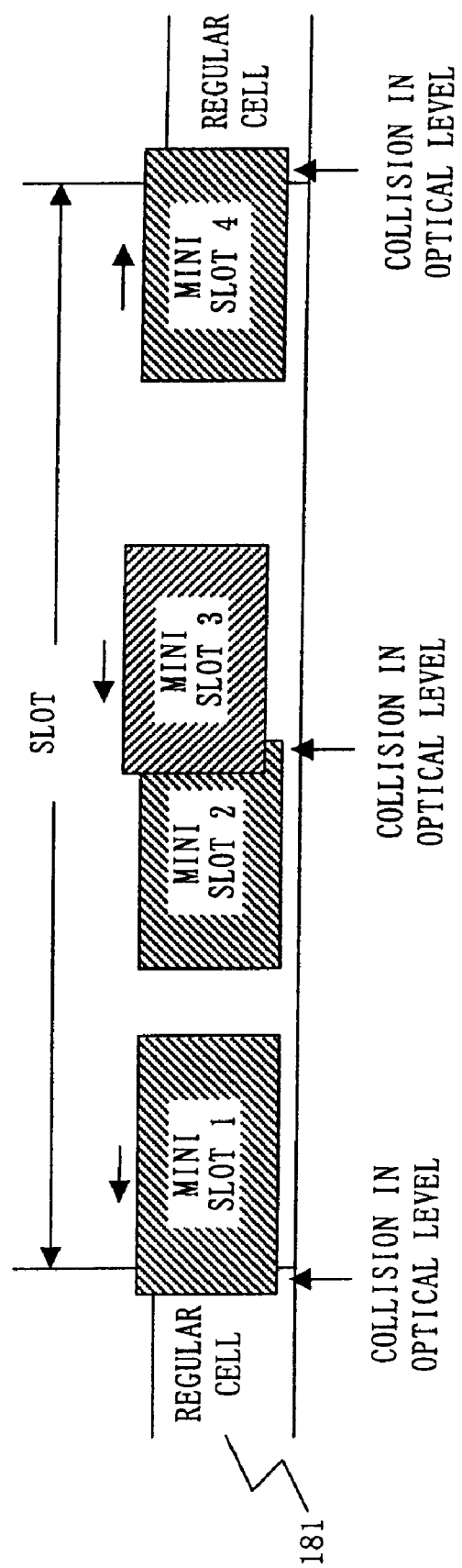
FIG. 9 shows a chart for explaining that a mini slot signal in a slot misjudges a phase of transmission and that prevents transmission of another regular cell or mini slot signal.

In this embodiment, when a state as illustrated in FIG. 9 occurs, since phases of mini slot signal 1 and mini slot signal 2 are not correct, CPE-Di is detected. Therefore, this child station is controlled to become the state of DBA-ST2. Further, an instruction on the phase is sent to this child station in a downstream frame. The child station corrects the phase based on the instruction. As stated, an influence on another child station is temporary.

According to this invention, it is possible to monitor the mini slot signal in each of the ONU's individually besides the regular cell by providing a maintenance signal for the mini slot signal besides the regular cell when the OLT receives the mini slot signal. Further, by providing the state transition table corresponding to the dynamic bandwidth assignment (DBA) for upstream by using the mini slot signal, when a failure, e.g., the error in the phase of sending the mini slot signal, etc. occurs in an ONU, only the mini slot signal in failure can be separated from the regular cell and other mini slot signals of which communication is interfered with. Accordingly, it is possible to reduce an interference with the communication of other ONU's by the mini slot signal in failure.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is limited only as defined in the following claims and the equivalents thereto.

What is claimed is:

1. A passive optical network comprising:
a parent station OLT (optical line terminal); and
a plurality of child stations ONU (optical network terminating unit), wherein
the parent station and the plurality of child stations transmit an upstream frame and a downstream frame to each other,
the parent station includes means for generating a maintenance signal indicating failure at a mini slot, corresponding to each of the plurality of child stations, on a basis of a receiving state of a signal at the mini slot sent from each of the plurality of child stations,
the means for generating the maintenance signal detects at least one of the following failures at the mini slot:
the parent station does not receive a mini slot signal in an expected period for the mini slot in the upstream frame consecutively n times (n is a positive integer),
the parent station receives an ineffective delimiter consecutively n times (n is a positive integer), and
the parent station fails to control a phase of the mini slot exceeding a limit while receiving a correct delimiter, and
the parent station includes means for instructing, based on a state transition table, a child station to transit to a state other than an operation state when the parent station detects the failure at the mini slot.

2. The passive optical network of claim 1, wherein the positive integer is eight.

3. The passive optical network of claim 1, wherein the parent station comprises a dynamic bandwidth assignment (DBA) controller for controlling bandwidth of a stream in the upstream frame from each of the plurality of child stations to the parent station depending on the maintenance signal.

4. The passive optical network of claim 3, wherein the parent station comprises means for dynamically assigning the bandwidth of the stream for the child stations in the upstream frame.

5. The passive optical network of claim 3, wherein the parent station comprises means for relating a state of controlling the child stations individually with the maintenance signal in the mini slot for controlling the bandwidth of the stream in the upstream frame.

6. The passive optical network of claim 1, wherein the parent station comprises means for resetting the maintenance signal as a result of detecting the following state:
the parent station receives an optical signal matched with its mini slot GRANT.

7. The passive optical network of claim 1, wherein the parent station comprises means for controlling a state of the child stations individually by using the maintenance signal.

8. The passive optical network of claim 1, further comprising:
means for separating the mini slot signal in failure from the upstream frame and other mini slot signals.

9. A control method for a passive optical network including a parent station OLT (optical line terminal) and a plurality of child stations ONU (optical network terminating unit) for transmitting an upstream frame and a downstream frame to each other, the control method comprising:
generating, at the parent station, a maintenance signal indicating failure at a mini slot, corresponding to each of the plurality of child stations, on the basis of a receiving state of a signal at the mini slot sent from each of the plurality of child stations;
detecting at least one of the following failures at the mini slot:
the parent station does not receive a mini slot signal in an expected period for the mini slot in the upstream frame consecutively n times (n is a positive integer),
the parent station receives an ineffective delimiter consecutively n times (n is a positive integer), and
the parent station fails to control a phase of the mini slot exceeding a limit while receiving a correct delimiter; and
instructing, based on a state transition table, a child station to transit to a state other than an operation state when the parent station detects the failure at the mini slot.

10. The control method for a passive optical network of claim 9, wherein the positive integer is eight.

11. The control method for a passive optical network of claim 9, wherein the control method comprises:
controlling bandwidth of a stream in the upstream frame from each of the plurality of child stations to the parent station depending on the generated maintenance signal.

12. The control method for a passive optical network of claim 11, wherein the control method comprises:
assigning dynamically the bandwidth of the stream from the child stations in the upstream frame.

13. The control method for a passive optical network of claim 9, wherein the control method comprises:
resetting the maintenance signal by detecting the following state:
receiving an optical signal matched with its mini slot GRANT.

14. The control method for a passive optical network of claim 9, further comprising:
separating the mini slot signal in failure from the upstream frame and other mini slot signals.

15. A parent station OLT (optical line terminal) comprising:
a communication unit that communicates with each of a plurality of child stations ONU (optical network terminating unit) in a passive optical network, wherein the parent station and the plurality of child stations transmit an upstream frame and a downstream frame to each other; and
a signal generator that generates a maintenance signal indicating failure at a mini slot, corresponding to each of the plurality of child stations, on a basis of a receiving state of a signal at the mini slot sent from each of the plurality of child stations, wherein
the signal generator detects at least one of the following failures at the mini slot:
the parent station does not receive a mini slot signal in an expected period for the mini slot in the upstream frame consecutively n times (n is a positive integer),
the parent station receives an ineffective delimiter consecutively n times (n is a positive integer), and
the parent station fails to control a phase of the mini slot exceeding a limit while receiving a correct delimiter, and
the parent station includes an instructing unit that instructs, based on a state transition table, a child station to transit to a state other than an operation state when the parent station detects the failure at the mini slot.

* * * * *